United States Patent
Kanai

(10) Patent No.: US 7,631,026 B2
(45) Date of Patent: Dec. 8, 2009

(54) SIGNAL PROCESSING METHOD AND SIGNAL PROCESSING CIRCUIT

(75) Inventor: Izumi Kanai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 752 days.

(21) Appl. No.: 11/051,179

(22) Filed: Feb. 7, 2005

(65) Prior Publication Data

US 2005/0182808 A1     Aug. 18, 2005

(30) Foreign Application Priority Data

Feb. 16, 2004  (JP)  ............... 2004-038973
Jan. 27, 2005  (JP)  ............... 2005-020042

(51) Int. Cl.
*G06F 1/02*   (2006.01)
*H04N 5/14*   (2006.01)

(52) U.S. Cl. .................... 708/270; 348/671

(58) Field of Classification Search ............. 708/270; 348/671, 672, 674; 345/690
See application file for complete search history.

(56) References Cited

U.S. PATENT DOCUMENTS

| | | | | |
|---|---|---|---|---|
| 5,517,333 A | * | 5/1996 | Tamura et al. | 358/518 |
| 6,040,860 A | * | 3/2000 | Tamura et al. | 348/252 |
| 6,442,294 B1 | * | 8/2002 | Nishizawa et al. | 382/168 |
| 6,529,211 B2 | * | 3/2003 | Ohara et al. | 345/690 |
| 7,436,413 B2 | | 10/2008 | Kanai | 345/611 |
| 2005/0190968 A1 | | 9/2005 | Kanai et al. | 382/169 |
| 2005/0206660 A1 | | 9/2005 | Kanai | 345/691 |

FOREIGN PATENT DOCUMENTS

| JP | 03-126377 A | 5/1991 |
|---|---|---|
| JP | 2512562 B2 | 4/1996 |

* cited by examiner

*Primary Examiner*—Chuong D Ngo
(74) *Attorney, Agent, or Firm*—Fitzpatrick, Cella, Harper & Scinto

(57) ABSTRACT

A signal processing method includes a first step of calculating a value indicating a value obtained by multiplying a ratio of the number of times of inputting the input signal having any one of values from p to m, where m is a maximum value of values of input signal which are subject to said signal processing and p is a value smaller than m and not a minimum value of the input signal, within a predetermined period to the number of times of inputting the input signal within the predetermined period, by the variable range of the converted value; and a second step of subtracting the calculated value from a maximum value within the variable range of the converted value or a value near the maximum value, wherein the input signal is converted according to the conversion characteristic specified based on a value obtained by subtraction.

5 Claims, 13 Drawing Sheets

SIGNAL PROCESSING METHOD AND SIGNAL PROCESSING CIRCUIT

BACKGROUND OF THE INVENTION

1. Field of the Invention

The present invention relates to a signal processing method and a signal processing circuit adapted to a processing for converting an input signal.

2. Description of the Related Art

There has been conventionally proposed, as a method for converting a gamma characteristic (γ-characteristic) of an input image, a method disclosed in Japanese Patent Application Laid-Open No. 3-126377 and Japanese Patent No. 2512562.

With this method, the number of histograms corresponding to one image plane of the input image is counted, the histograms are subjected to a limit processing, a constant addition processing, and the like, and a cumulative histogram is calculated.

To use the cumulative histogram thus calculated as a gamma table, the cumulative histogram is normalized (scaled) so that a maximum value of the cumulative histogram is a maximum output of the gamma table.

SUMMARY OF THE INVENTION

According to a first aspect of the present invention, there is provided a signal processing method for converting an input signal into a converted value within a predetermined variable range according to a predetermined conversion characteristic, the method comprising: a first step of calculating a value that indicates a value obtained by multiplying a ratio of the number of times of inputting the input signal having any one of values from p to m, where the value m is a maximum value of values of input signal which are subject to said signal processing and the value p is a value smaller than the value m and not a minimum value of the input signal, within a predetermined period to the number of times of inputting the input signal within the predetermined period, by the variable range of the converted value; and a second step of subtracting the value calculated at the first step from a maximum value within the variable range of the converted value or a value near the maximum value, wherein the input signal is converted according to the conversion characteristic specified based on a value obtained by subtraction at the second step.

According to a second aspect of the present invention, it is preferable that the signal processing method according to the first aspect of the invention further comprises a step of specifying the conversion characteristic, wherein the step is a step of dividing the variable range of the input signal into a plurality of ranges, and of specifying the conversion characteristic corresponding to a frequency at which the input signal belonging to each of the divided ranges is input, within the predetermined period, and the conversion characteristic specified at this step includes, as the conversion characteristic corresponding to input signals having the values p to m, the conversion characteristic specified by an interpolated value obtained by performing an interpolation using at least the value obtained at the second step and the maximum value within the variable range of the converted value or the value near the maximum value as interpolation source data.

It is particularly preferable to specify the conversion characteristic so that the frequency of the converted value corresponding to the range (region) having a high frequency is high (so that the number of input signals belonging to the range (region) is large). In addition, the present invention is particularly preferably used for an image signal processing. The predetermined period is preferably a period during which signals corresponding to an image of one image plane (more specifically one field or one frame) are input.

A configuration of performing the interpolation using at least the two values as the interpolation source data can be, for example, a linear interpolation. However, the other interpolation method can be adopted. For example, if an interval between the value obtained at the second step and the substantially maximum value within the variable range of the converted value is linearly interpolated and the input signal has the value p, the value obtained at the second step is output as an output value. However, the present invention is not limited to this. For example, if a discontinuity of the conversion characteristic from a conversion characteristic in the other range of the input signal (e.g., the range from q to p to be described later), an interpolation method other than the linear interpolation can be adopted by further using the other interpolation source data (e.g., a value obtained at a fourth step to be described later).

In the present invention, an expression of "a maximum value of possible signal processing target values (a maximum value of values which are subject to said signal processing)" is used. This is because the function of the present invention can be attained even if the value is not strictly equal to the maximum value of the input signal. If the input signal belonging to the range from p to m, for example, it suffices that the value m is not strictly equal to the maximum value of the input signal but may be a maximum value of the possible signal processing target values of the input signal (a value for calculating a value that indicates a value obtained by multiplying the ratio of the number of times of inputting the input signal during the predetermined period to the number of input signals during the predetermined period, by the variable range of the converted value). More specifically, if the possible values of the input signal are 0 to 255 and the maximum value of the possible signal processing target values is 254, the maximum value is 254. In light of this respect, the present application uses the expression of "a maximum value of possible signal processing target values (a maximum value of values which are subject to said signal processing)".

Furthermore, in the present invention, an expression of a maximum value or "a value near the maximum value" is used. This is because the technical concept of the present invention does not require that the value is strictly equal to the maximum value. The "value near the maximum value" means herein is a value which a person who carries out the present invention can set within the scope of the technical concept of the present invention, preferably a value within a range from −1% to +1% of the maximum value.

According to a third aspect of the present invention, it is also preferable that the signal processing method according to the first aspect of the present invention further comprises: a third step of calculating a value that indicates a value obtained by multiplying a ratio of the number of times of inputting the input signal having any one of values q to p, where the value q is a value smaller than the value p and that is not the substantially minimum value of the input signal, within the predetermined period to the number of times of inputting the input signal within the predetermined period, by the variable range of the converted value; and a fourth step of calculating a value obtained by subtracting the value calculated at the third step from the value calculated at the second step, wherein the conversion characteristic includes, as the conversion characteristic corresponding to the input signals having the values q to p, the conversion characteristic specified by an interpolated value obtained by performing the interpolation using at least the value obtained at the fourth step and the value obtained at the second step as the interpolation source data.

In the above and the following description, a notation of $n^{th}$ step is used. However, this is used simply to discriminate the respective steps for the sake of convenience and not intended to limit the present invention to a configuration of sequentially executing the respective steps in this order.

Further, the step of calculating the value obtained by subtracting the value calculated at the third step from the value calculated at the second step is not limited to a configuration of actually performing an operation of subtracting the value obtained at the third step from the value obtained at the second step. The step may be, for example, a step of obtaining the value desired at this step by performing the other operation of, for example, subtracting a sum of the value obtained at the first step and the value obtained at the third step from the substantially maximum value within the variable range of the converted value.

It is desirable that a plurality of ranges (including both of or one of a range from p to m and a range from q to p) are not overlapped with one another for accuracy purposes. However, they may be slightly overlapped. Accordingly, if the above-stated aspects of the invention and the following aspects of the invention include the requirement of adjacent ranges such as the range from p to m and the range from q to p, it is preferable to deal with the value (e.g., p) considered to be included in one of the ranges so as not to be included in the other range. If the range equal to or greater than p and equal to or smaller than m is considered as the range from p to m, it is preferable that the range from q to p does not include the value p. However, an instance in which both the range from p to m and the range from q to p include the value p also falls within the range of the present invention.

According to a fourth aspect of the present invention, it is further preferable that the signal processing method according to the first aspect of the present invention further comprises: a fifth step of calculating a value that substantially indicates a value obtained by multiplying a ratio of the number of times of inputting the input signal having any one of values from the substantially minimum value (the minimum value of the possible signal processing target values) of the input signal to a value r that is a predetermined value smaller than the value p within the predetermined period to the number of times of inputting the input signal within the predetermined period, by the variable range of the converted value, wherein the conversion characteristic includes, as the conversion characteristic corresponding to the input signals having the minimum value of the possible signal processing target values of the input signal (the minimum value of values of input signals which are subject to said signal processing) to the value r, the conversion characteristic specified by an interpolated value obtained by performing the interpolation using at least a minimum value within the variable range of the converted value or a value near the minimum value and the value obtained at the fifth step as the interpolation source data.

According to a fifth aspect of the present invention, it is further preferable that the signal processing method according to the first aspect of the present invention further comprises: a sixth step of calculating a value that substantially indicates a value obtained by multiplying a ratio of the number of times of inputting the input signal having any one of values from the value r to a value s, where the value s is a predetermined value smaller than the value p, within the predetermined period to the number of times of inputting the input signals within the predetermined period, by the variable range of the converted value; and a seventh step of calculating a value obtained by adding up the value calculated at the fifth step and the value calculated at the sixth step, wherein the conversion characteristic includes, as the conversion characteristic corresponding to the input signals having the values r to s, the conversion characteristic specified by an interpolated value obtained by performing the interpolation using the value obtained at the fifth step and the value obtained at the seventh step as the interpolation source data.

The invention according to the fourth or fifth aspect of the invention can be combined with the third aspect of the invention. If so, the value r is preferably a value smaller than q.

According to a sixth aspect of the present invention, there is provided a signal processing method for converting an input signal into a converted value within a predetermined variable range according to a predetermined conversion characteristic, the method comprising: an eighth step of counting the number of times of inputting the input signal having any one of values from p to m, where the value m is a maximum value of possible signal processing target values of the input signal and the value p is a value that is smaller than the value m and that is not a substantially minimum value of the input signal, within a predetermined period; a ninth step of subtracting the counted number from a value obtained by multiplying a substantially maximum value within the variable range of the converted value by a predetermined number; and a tenth step of calculating a value that substantially indicates a value obtained by dividing a value obtained by subtraction at the ninth step by the predetermined number, wherein the converted value is converted according to the conversion characteristic specified based on the value calculated at the tenth step.

The present invention can provide the signal processing method capable of realizing the conversion processing by the simple operation. In addition, by applying the present invention to a television signal image processing, a gamma conversion method for appropriately converting a gamma characteristic according to an input image, and for obtaining a good sense of contrast can be provided.

DETAILED DESCRIPTION OF THE PREFERRED EMBODIMENTS

Best embodiments for carrying out the present invention will be described hereinafter. According to the embodiments, a conversion processing that does not change a maximum converted value irrespective of a change in an input signal by a simple operation can be realized.

First Embodiment

Figure 1:
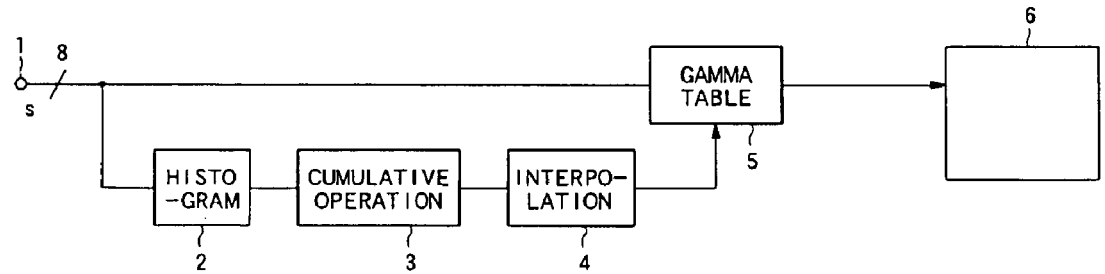
FIG. 1 is a circuit block diagram that depicts a signal processing method according to embodiments of the present invention.
Figure 2:
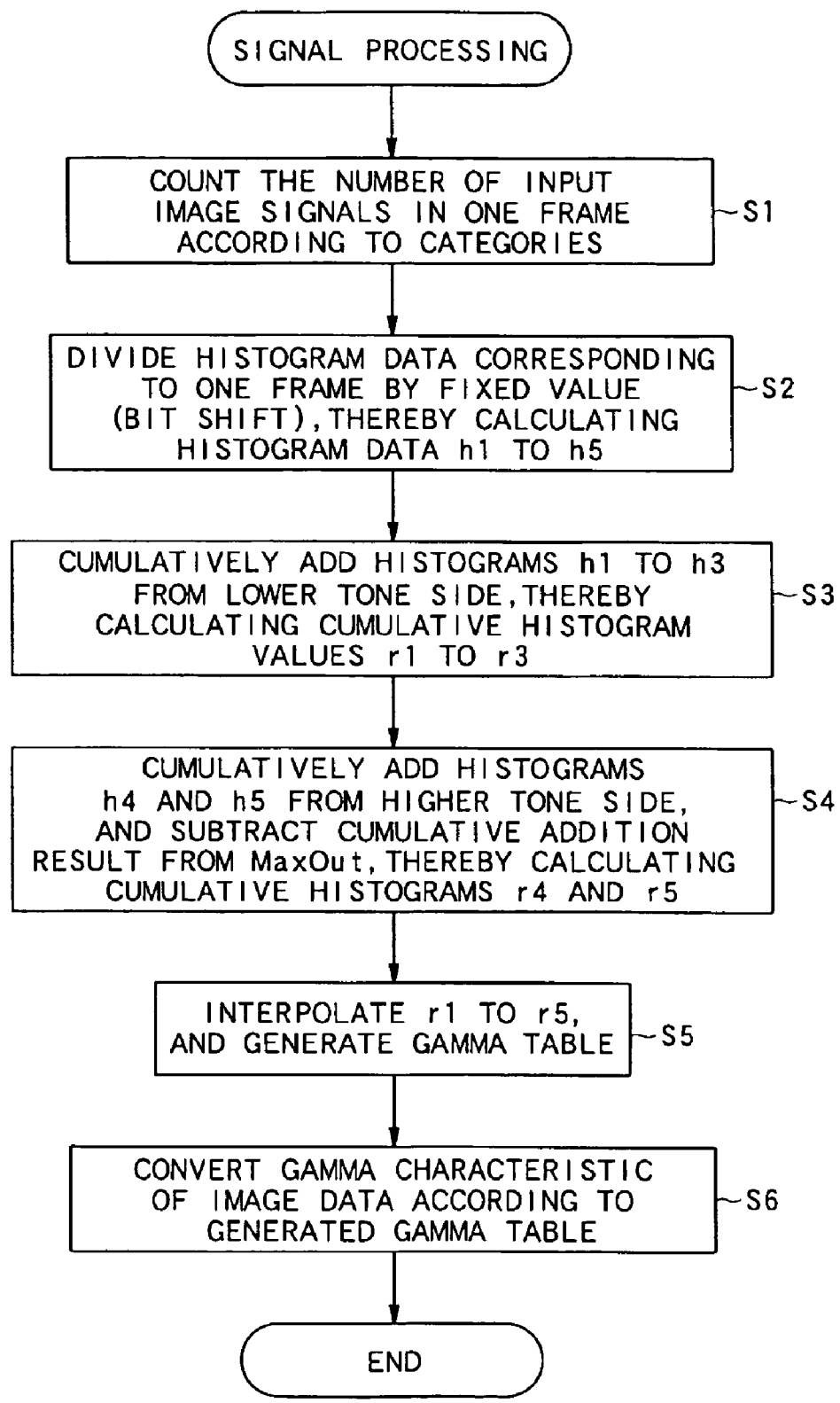
FIG. 2 is a flowchart that depicts procedures for a signal processing method according to a first embodiment of the present invention.

FIG. 1 is a circuit block diagram that depicts a signal processing method according to embodiments of the present invention. FIG. 2 is a flowchart that depicts processing procedures for a signal processing method according to a first embodiment.

Reference symbol 1 denotes an image data input terminal, 2 denotes a histogram counter (corresponding to a counter unit and a division unit), 3 denotes a cumulative operation unit (corresponding to an operation unit), 4 denotes an interpolation unit, 5 denotes a gamma table (corresponding to a conversion unit), and 6 denotes a display unit.

Image data s such as luminance data (Y data) or RGB data is input to the input terminal 1. In this embodiment, the image data s is assumed to be digital data of eight bits. For brevity of description, FIG. 1 shows that data input to the histogram counter 2 is equal to data input to the gamma table 5. However, the present invention is not limited to this. The luminance data may be input to the histogram counter 2 whereas the RGB data obtained by subjecting the luminance data to a color space conversion may be input to the gamma table 5. In this embodiment, an input signal has a variable range from 0 to 255, and a maximum value m has 255 tones.

Figure 3:
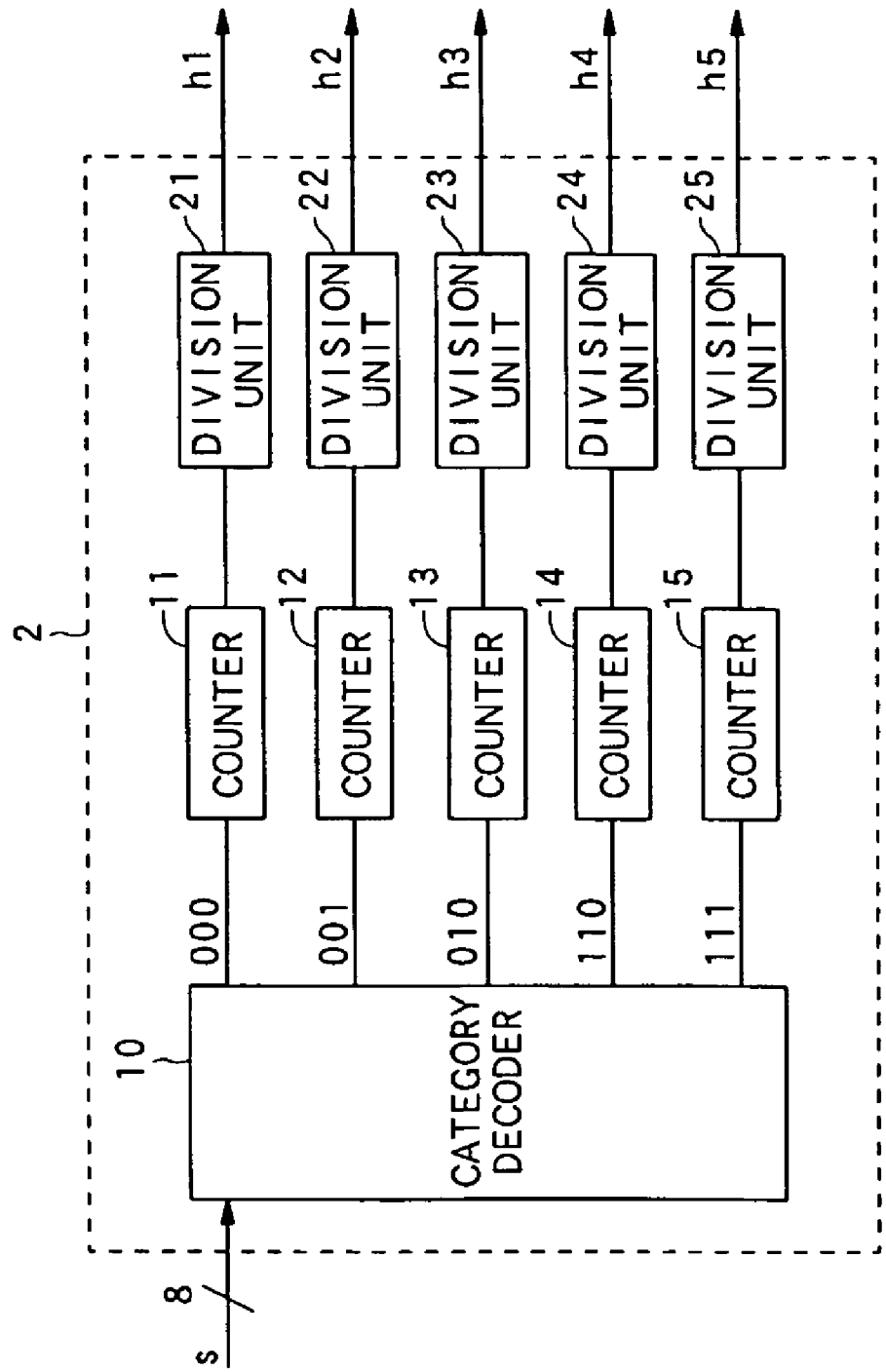
FIG. 3 is a detailed view of a histogram counter according to the first embodiment.

The histogram counter 2 counts the number of histograms corresponding to one frame of the input image data. FIG. 3 is a detailed view of the histogram counter 2. Reference symbol 10 denotes a category decoder, 11 to 15 denote counters, and 21 to 25 denote division units.

The image data s is input to the decoder 10, in which the image data s is category-decoded using higher three bits among the eight bits of data. The number of pixels having higher three bits of 000 (0 to 31 tones) is counted by the counter 11, the number of pixels having higher three bits of 001 (32 to 63 tones) is counted by the counter 12, and the number of pixels having higher three bits of 010 (64 to 95 tones) is counted by the counter 13. In addition, the number of pixels having higher three bits of 110 (192 to 223 tones) is counted by the counter 14, and the number of pixels having higher three bits of 111 (224 to 255 tones) is counted by the counter 15. Namely, the variable range of the input signal is divided into ranges of 0 to 31(r), 32 to 63(s), 64 to 95, 192(q) to 223, and 224(p) to 255, and the number of pixels of the input signal belonging to each of the ranges is counted. Symbols in parentheses show correspondence between values r, s, q, and p set forth in claims and values described in this embodiment.

Normally, if an image signal is decoded using higher three bits of the signal, the number of histograms in eight categories of 000, 001, 010, 011, 100, 101, 110, and 111 are counted. In this embodiment, however, the number of histograms only in three lower tone-side categories (000, 001, and 010) and two higher tone-side categories (110 and 111), i.e., five categories in all are counted (at a step S1). A count value of each of the counters is divided by the number of input signals corresponding to one frame (2073600 because of an image size of 1920×1080), whereby a ratio of the number of input signals belonging to each divided range to the total number of input signals corresponding to one frame can be calculated. A division result is multiplied by 256 that is the variable range of the converted value, whereby a result of appropriately scaling a frequency of each range to specify a conversion characteristic can be obtained. However, as will be described later, according to the present invention, a value corresponding to the frequency of each higher tone-side range is obtained based on a substantially maximum value in the variable range of the converted value by subtraction. It is unnecessary to perform a strict calculation. In this embodiment, therefore, an approximation calculation is performed as follows.

The counters 11 to 15 include latch circuits, not shown, respectively. When each of the respective counters 11 to 15 finishes counting the number of histograms corresponding to one frame, the counter outputs histogram data on one frame to each of the division units 21 to 25 in the next stage using a vertical synchronization signal.

Each of the division units 21 to 25 divides the histogram data corresponding to one frame and output from each of the counters 11 to 15 by a fixed value, thereby scaling the data to have an appropriate level for the gamma table (at a step S2). This division may be a simple division. In this embodiment, bit shift is performed as the division.

In this embodiment, the gamma table 5 is assumed to output eight bits of data. Namely, the variable range of the converted value output after being subjected to the gamma conversion is 0 to 255. The input image size is 1920×1080 (=2073600) (corresponding to the number of input signals input during a predetermined period). Accordingly, a value (an approximate value in this embodiment) that indicates a value obtained by multiplying the ratio of the count value to the total number of input signals corresponding to one frame, by the variable range of the converted value can be obtained by dividing the count value by 8192. The operation of dividing the count value by 8192 can be realized by a digital processing of shifting data to the right by 13 bits. Each of the division units 21 to 25, therefore, shifts the input histogram data to the right by 13 bits (corresponding to division of the data by 8192). As a result, the pieces of histogram data fall within the eight-bit range, so that appropriate values for the gamma table 5 that outputs eight bits can be obtained.

Figure 4:
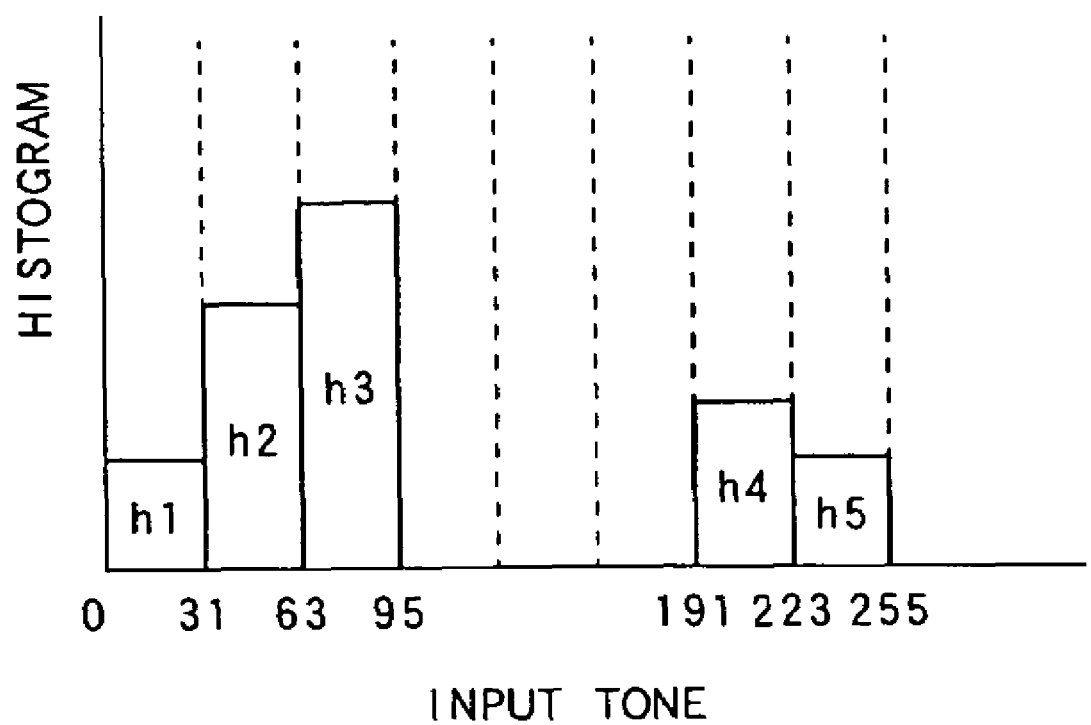
FIG. 4 is a chart that depicts histograms corresponding to a certain frame.

Consequently, pieces of histogram data h1 to h5 in the three lower tone-side categories and the two higher tone-side categories are obtained. FIG. 4 depicts the histogram data on a certain frame.

Figure 5:
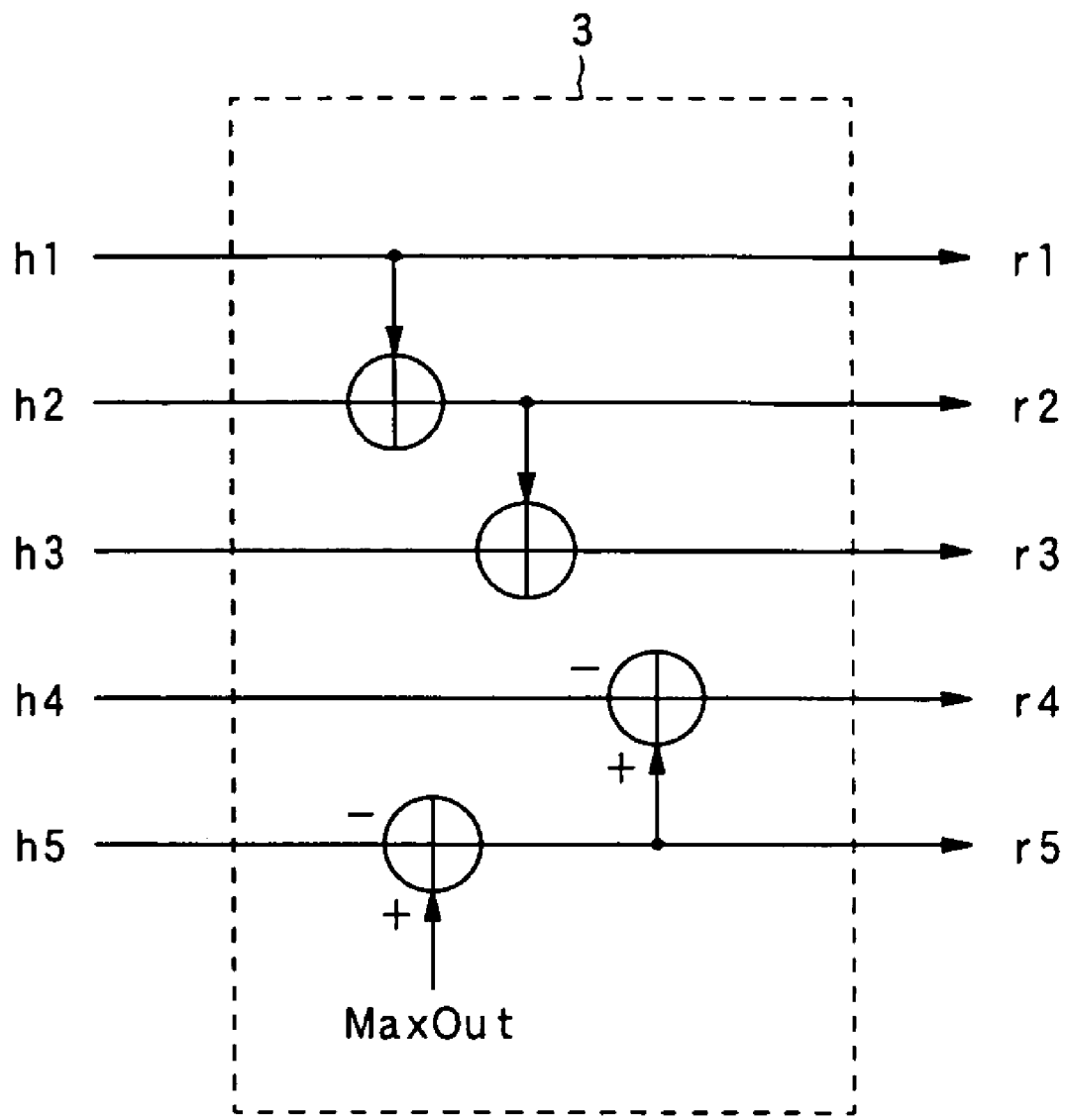
FIG. 5 is a detailed view of a cumulative operation unit.

The pieces of histogram data h1 to h5 output from the histogram counter 2 are input to the cumulative operation unit 3 in the next stage. FIG. 5 is a detailed view of the cumulative operation unit 3.

The cumulative operation unit 3 obtains pieces of cumulative data r1, r2, and r3 from the histogram data h1, h2, and h3 in the three lower tone-side categories by the following calculation, respectively (at a step S3).

$$r1 = h1$$

$$r2 = h1 + h2 = r1 + h2$$

$$r3 = h1 + h2 + h3 = r2 + h3 \qquad (1)$$

As for the histogram data h4 and h5 in the two higher tone-side categories, a cumulative operation is performed from a higher tone side (255 tone side), and resultant cumulative data is subtracted from a maximum output value (hereinafter, "MaxOut") of the gamma table 5. As a result, the following pieces of cumulative data r4 and r5 are obtained (at a step S4)

$$r5 = \text{MaxOut} - h5$$

$$r4 = \text{MaxOut} - (h5 + h4) = r5 - h4 \quad (2)$$

In the equations (2), if the gamma table 5 outputs eight bits, the MaxOut is 255. In this embodiment, the MaxOut is a maximum value in the variable range of the converted value. If the pieces of histogram data counted in one frame is those shown in FIG. 4, pieces of the cumulative data r1 to r5 obtained by the cumulative operation unit 3 are those shown in FIG. 6.

The interpolation unit 4 interpolates the cumulative data r1 to r5 obtained by the cumulative operation unit 3, and generates the gamma table (at a step S5).

Figure 6:
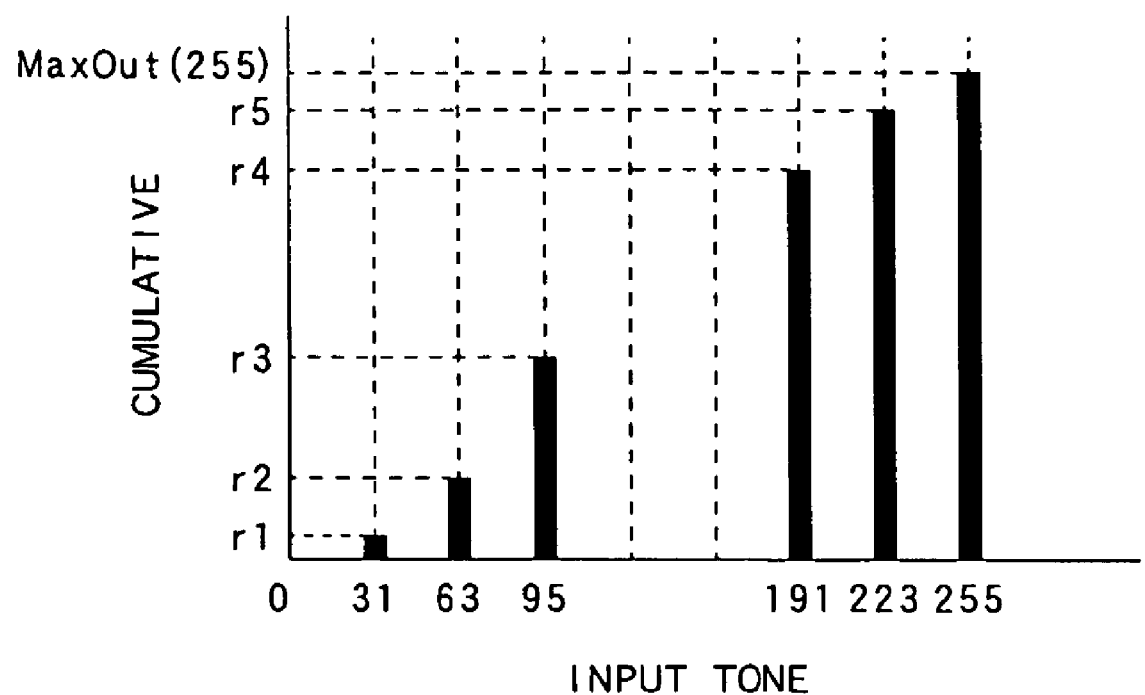
FIG. 6 depicts cumulative data on the certain frame.

As shown in FIG. 6, in this embodiment, the cumulative data r1 is an output having 31 tones, the cumulative data r2 is an output having 63 tones, the cumulative data r3 is an output having 95 tones, the cumulative data r4 is an output having 191 tones, and the cumulative data r5 is an output having 223 tones. In addition, the output having 255 tones is fixed to the MaxOut that is 255. A value p smaller than the maximum m (=255) of the input signal corresponds to 224.

Figure 7:
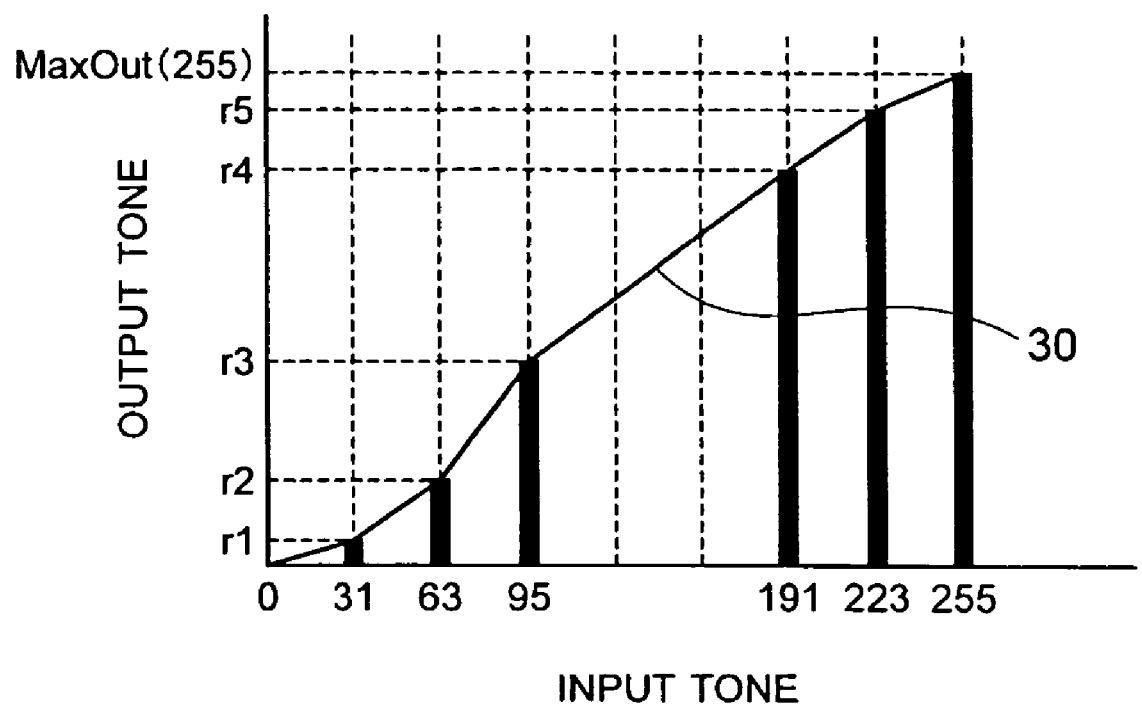
FIG. 7 depicts a gamma characteristic linearly interpolated by an interpolation unit.

In this embodiment, these pieces of cumulative data r1 to r5 are linearly interpolated, thereby generating the gamma table. In FIG. 7, reference symbol 30 denotes a gamma conversion characteristic curve obtained by linearly interpolating the pieces of cumulative data shown in FIG. 6. By writing this gamma conversion characteristic curve to the gamma table, the image data s is subjected to a gamma conversion and resultant data is displayed on the display unit 6 (at a step S6).

In this embodiment, the interpolation unit 4 performs the linear interpolation. However, the present invention is not limited to this and the interpolation unit 4 may perform a polynomial interpolation, a spline interpolation, or the like.

Examples of processing the image according to the above-stated configuration will now be described with reference to FIGS. 8A to 8C and 9A to 9C.

Figure 8A:
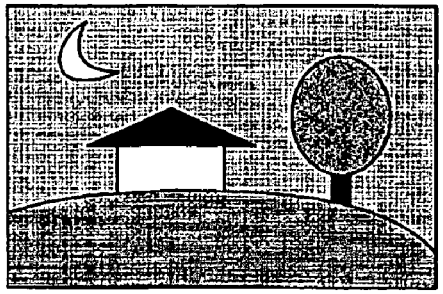
FIGS. 8A to 8C depict an example of processing a dark input image.
Figure 8B:
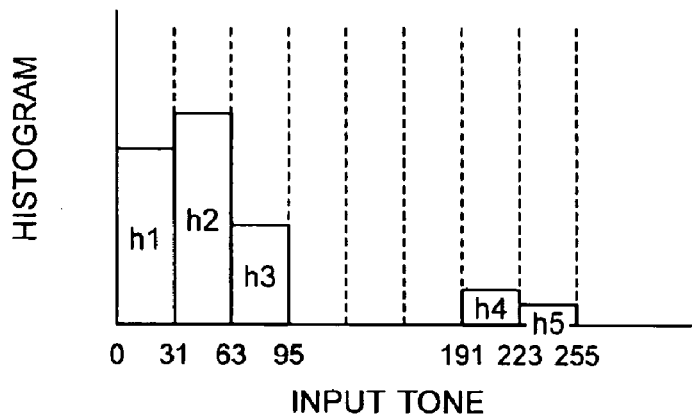
Figure 8C:
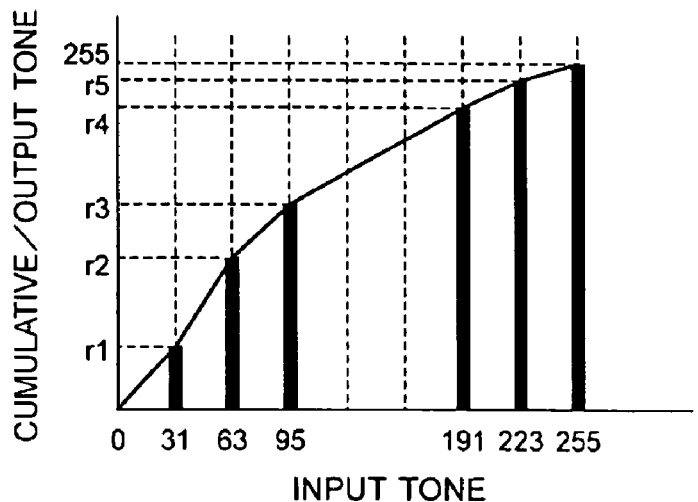

FIGS. 8A to 8C depict an example in which the input image is a dark image. FIG. 8A depicts the input image, FIG. 8B depicts pieces of histogram data, and FIG. 8C depicts pieces of cumulative data and the gamma conversion characteristic. As shown in FIG. 8B, the pieces of histogram data h1 to h5 counted by the histogram counter 2 are such that the pieces of lower tone-side histogram data have high frequencies. If these pieces of histogram data h1 to h5 are subjected to the cumulative operation and the linear interpolation, the gamma characteristic having a high inclination on the lower tone side and a low inclination on the higher tone side is obtained as shown in FIG. 8C. As a result, an image which has a dark part in an enhanced contrast and which is, therefore, easily visible can be obtained.

Figure 9A:
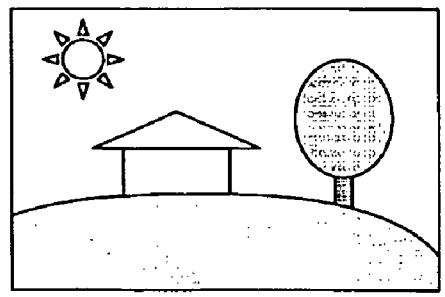
FIGS. 9A to 9C depict an example of processing a bright input image.
Figure 9B:
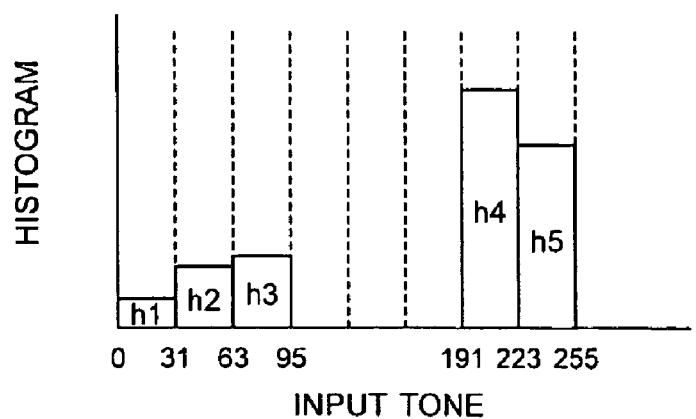
Figure 9C:
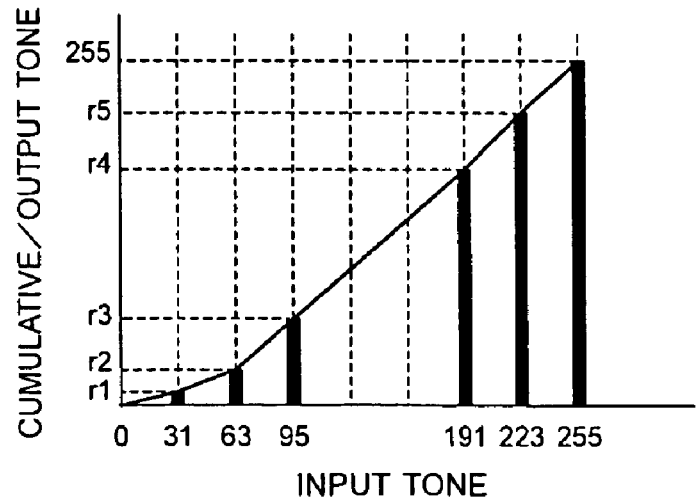

On the other hand, FIGS. 9A to 9C depict an example in which the input image is a bright image. As shown in FIG. 9B, the pieces of histogram data h1 to h5 are such that the pieces of higher tone-side histogram data having high frequencies. If these pieces of histogram data h1 to h5 are subjected to the cumulative operation and the linear interpolation, the gamma characteristic having a low inclination on the lower tone side and a high inclination on the higher tone side is obtained as shown in FIG. 9C. As a result, an image which has a bright part in an enhanced contrast and which is, therefore, easily visible can be obtained.

As stated above, according to the first embodiment, a good sense of contrast can be acquired according to the input image. In addition, during generation of the gamma table, the maximum output value of the gamma table can be fixed to a desired value even by the simple division such as the bit shift with respect to the cumulative data. The circuit can be, therefore, constituted to be simple.

Namely, according to this embodiment, signal processing with high accuracy can be performed without performing a process such as dividing a cumulative histogram by the maximum output value of the cumulative histogram and multiplying the maximum output data of the gamma table.

In this embodiment, each histogram data is category-decoded using higher three bits of the data during counting the number of histograms. However, the present invention is not limited to this, and the histogram data may be decoded using all eight bits or the other number of bits. In this embodiment, the pieces of histogram data in the three lower tone-side categories and in the two higher tone-side categories are counted. However, the present invention is not limited to this.

Second Embodiment

A processing block diagram according to a second embodiment of the present invention is shown in FIG. 1 similarly to the first embodiment. The second embodiment differs from the first embodiment in a configuration of the histogram counter 2.

Figure 10:
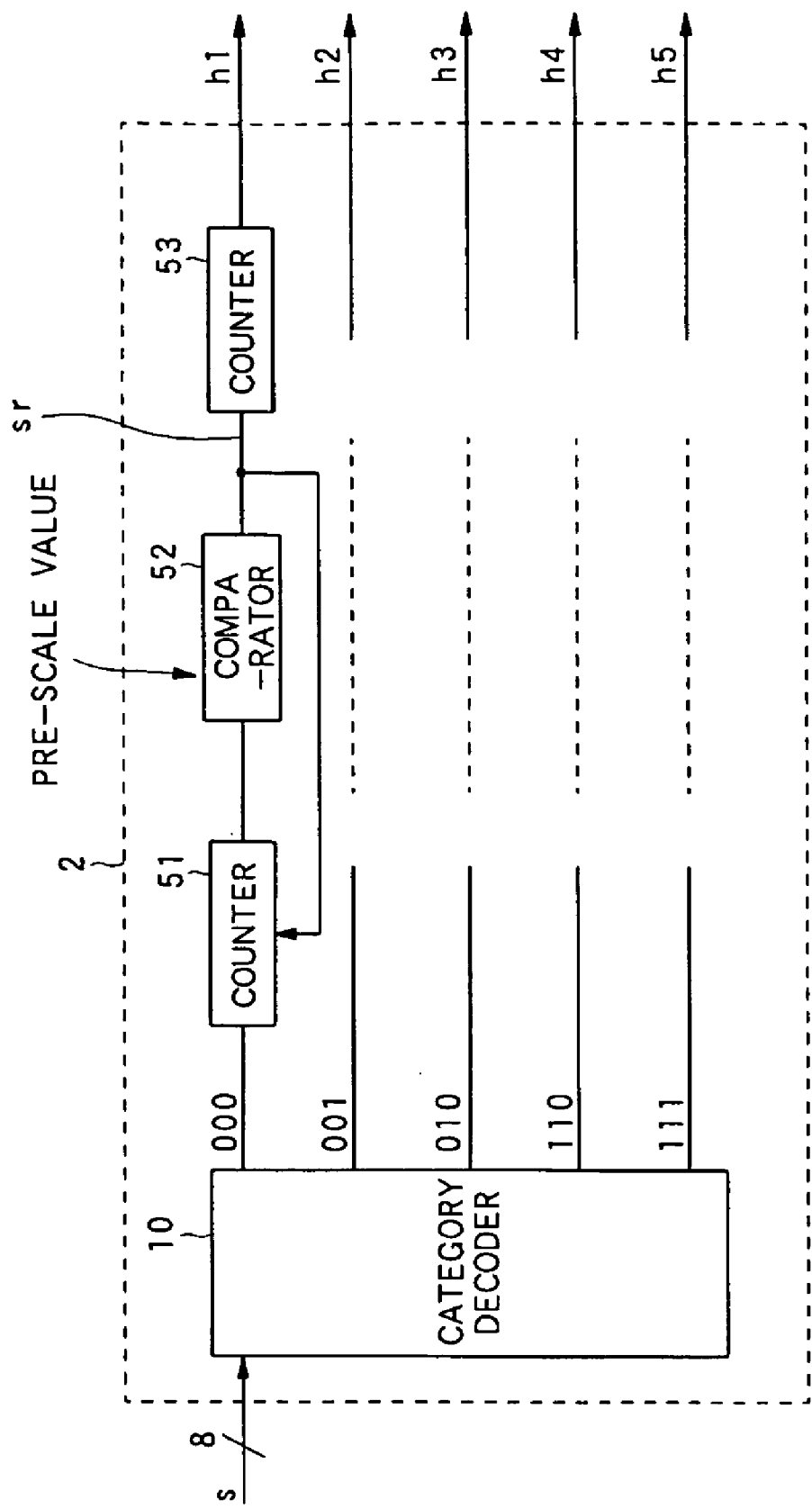
FIG. 10 is a detailed view of a histogram counter according to a second embodiment of the present invention.

FIG. 10 is a detailed view of the histogram counter 2 (corresponding to a counter unit) according to the second embodiment.

In FIG. 10, reference symbol 10 denotes a category decoder, 51 denotes a first counter, 52 denotes a comparator, and 53 denotes a second counter.

Image data s of eight bits is decoded by the category decoder 10 using higher three bits of the image data s. A processing performed by the category decoder 10 is the same as that performed by the category decoder 10 according to the first embodiment.

In FIG. 10, category-decoded signals are equally processed in all categories. Therefore, FIG. 10 shows only a data processing block for the higher three bits of 000 and does not show data processing blocks for the higher three bits of 001 to 111.

The counter 51 counts a frequency of pixels having the higher three bits of 000. Frequency data thus counted is output to the comparator 52 in the next stage. A preset pre-scale value is input to the comparator 52 in advance. If the frequency data output from the first counter 51 is equal to the pre-scale value, the comparator 52 outputs a reset signal sr. If a gamma table outputs eight bits and an input image size is 1920×1080, for example, the pre-scale value can be set at 8192.

The reset signal sr is input to the first counter 51 and the second counter 53. When the reset signal sr is input to the counter, the counter resets its count value at zero and counts the frequency of the pixels again. The second counter 53 counts the number of times of inputting the reset signal sr.

By thus constituting the histogram counter 2, a result of dividing the frequency data by the pre-scale value which is an integer can be obtained as an output of the second counter 53. As a result, the data is scaled to have an appropriate level for the gamma table. An output of the histogram counter 2 is processed similarly to the first embodiment.

Third Embodiment

A processing block diagram according to a third embodiment of the present invention is shown in FIG. 1 similarly to the first embodiment.

Figure 11:
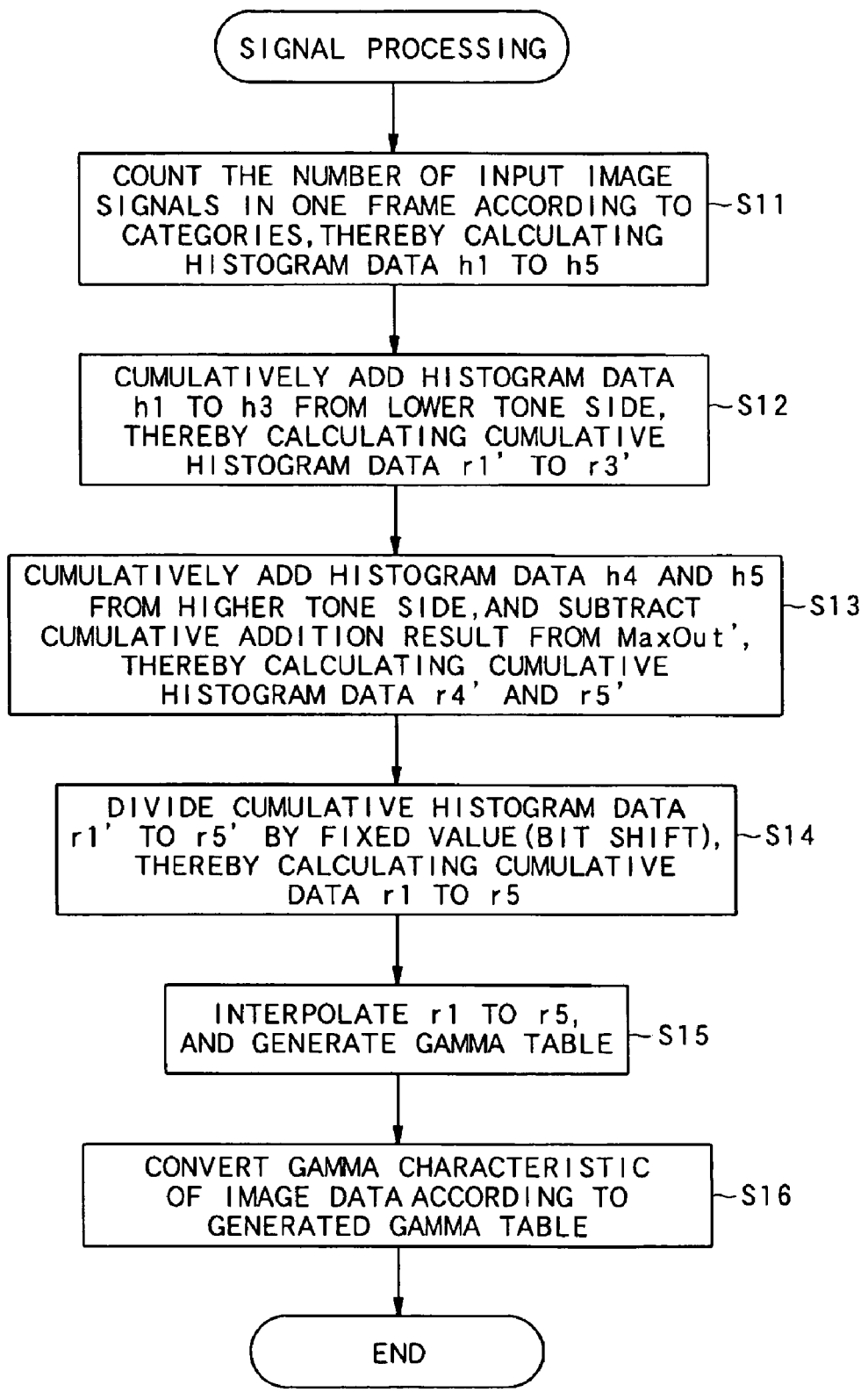
FIG. 11 is a flowchart that depicts processing procedures for a signal processing method according to a third embodiment of the present invention.

FIG. 11 is a flowchart that depicts processing procedures for a signal processing method according to a third embodiment. The third embodiment differs from the first embodiment in a configuration of the histogram counter 2 (corresponding to a counter unit) and that of the cumulative operation unit 3 (corresponding to an operation unit and a division unit).

Figure 12:
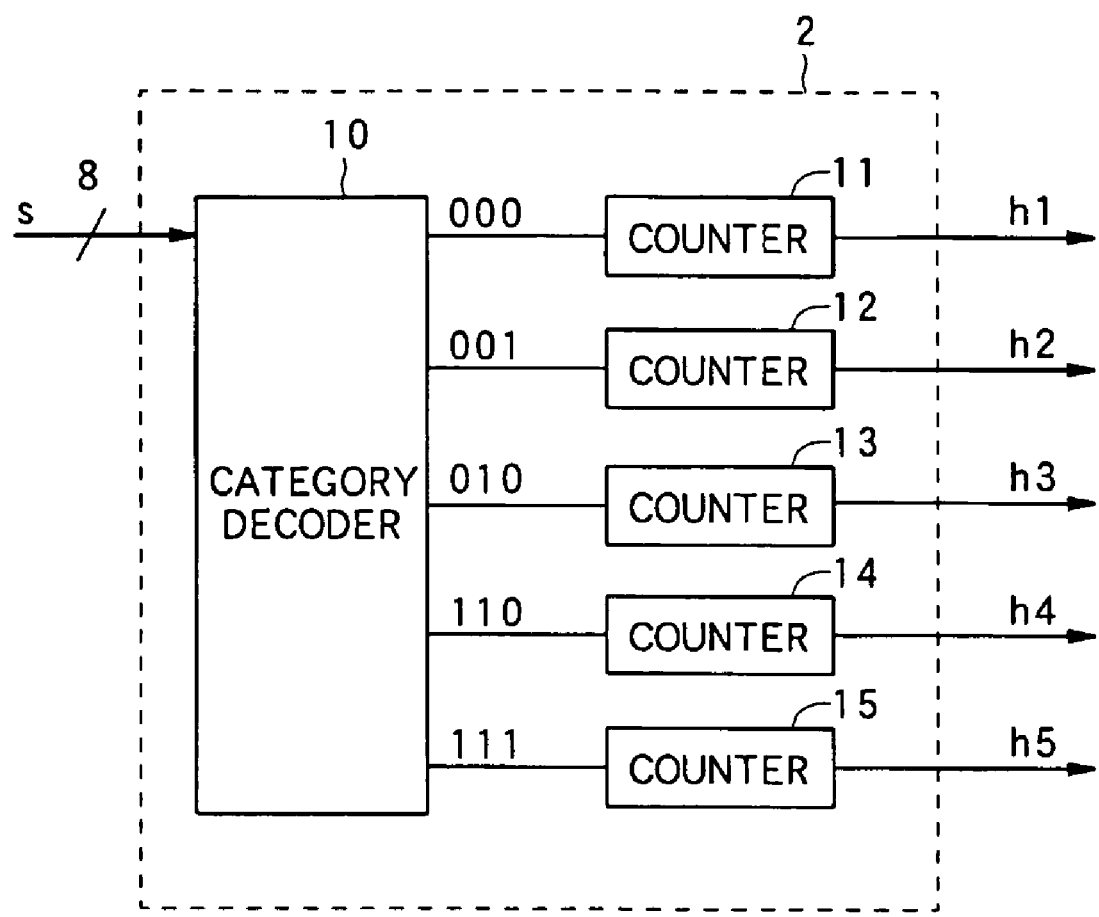
FIG. 12 is a detailed view of a histogram counter according to the third embodiment of the present invention.

FIG. 12 is a detailed view of the histogram counter 2 according to the third embodiment.

The histogram counter according to the third embodiment is constituted so that the division units 21 to 25 are removed from the histogram counter according to the first embodiment. Due to this, the histogram counter outputs non-scaled histogram data h1 to h5 (at a step S11).

Figure 13:
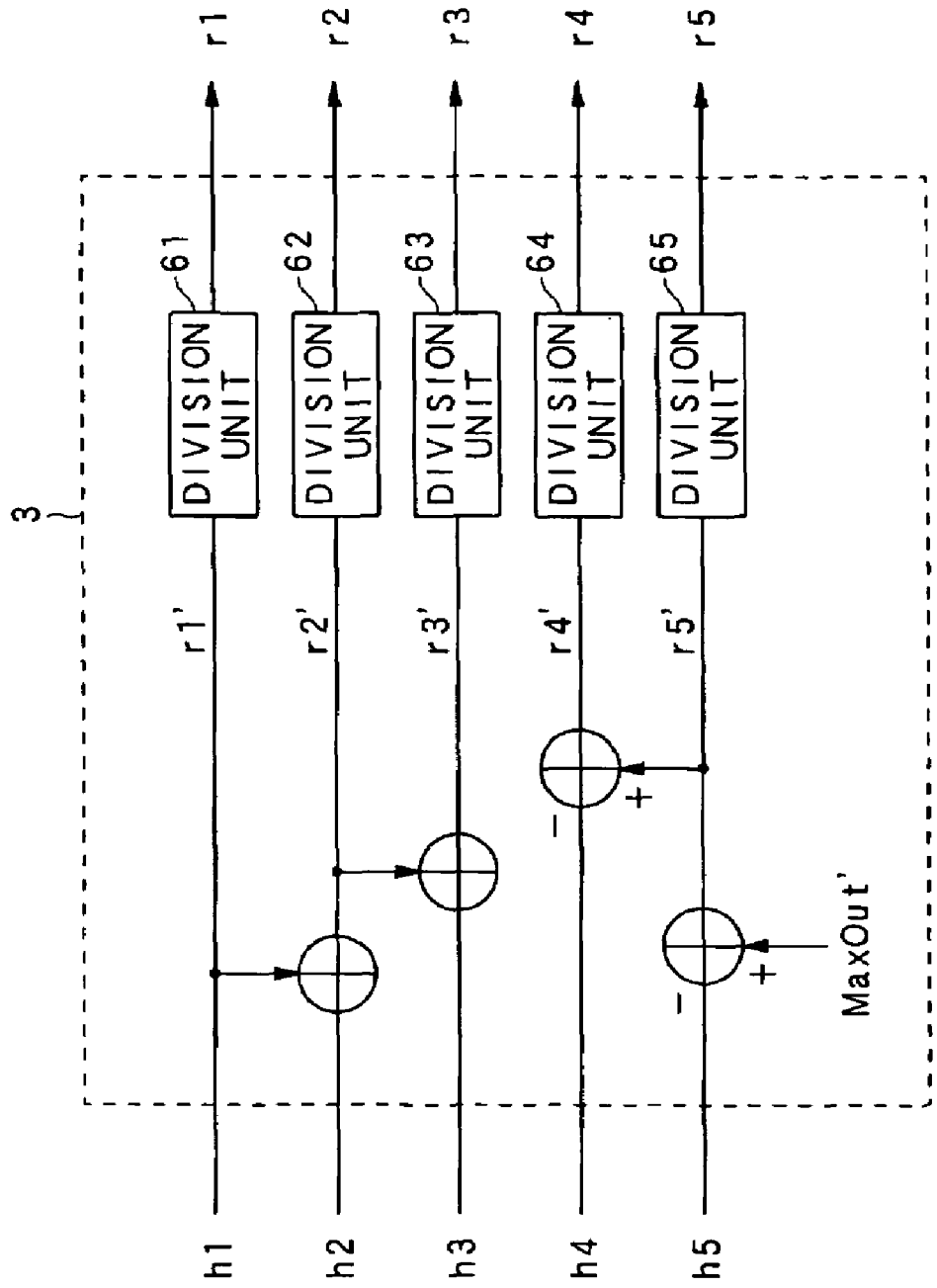
FIG. 13 depicts a cumulative operation unit according to the third embodiment of the present invention.

These pieces of histogram data h1 to h5 are input to the cumulative operation unit 3. FIG. 13 is a detailed view of the cumulative operation unit 3. The cumulative operation unit 3 calculates cumulative data r1' to r5' first by the similar calculation as that according to the first embodiment (at steps S12 and S13). Equations (3) for calculating the cumulative data r1' to r5' are as follows.

$$r1'=h1$$

$$r2'=h1+h2=r1'+h2$$

$$r3'=h1+h2+h3=r2'+h3$$

$$r5'=MaxOut'-h5$$

$$r4'=MaxOut'-(h5+h4)=r5'-h4 \quad (3)$$

If the gamma table outputs eight bits, the MaxOut' is a value obtained by shifting 255 to the left by predetermined bits (assumed as "A bits") (corresponding to a value obtained by multiplying 255 by $2^A$ times). This corresponds to a multiplication of a maximum value in the variable range of the converted value by a predetermined number, i.e., 2 raised to an $A^{th}$ power. This bit shift amount A is set equal to a bit shift amount obtained by a bit shift performed by each of division units 61 to 65 to be described later.

The pieces of cumulative data r1' to r5' thus obtained are input to the division units 61 to 65, respectively. Each of the division units 61 to 65 divides each cumulative data by a fixed value, thereby scaling the data to have an appropriate level for the gamma table (at a step S14). This division may be a simple division. In this embodiment, bit shift is performed as the division.

If the input image size is 1920×1080, for example, each data can be appropriately scaled by shifting the data to the right by 13 bits (corresponding to a division of the data by 8192). If so, the shift amount A of the MaxOut' is 13 (MaxOut'=255×8192).

The pieces of cumulative data r1' to r5' thus calculated are interpolated by the interpolation unit 4 similarly to the first embodiment, thereby generating the gamma table (at a step S15).

Similarly to the first embodiment, this gamma conversion characteristic curve is written to the gamma table 5 (corresponding to a conversion unit), whereby the image data is subjected to a gamma conversion and resultant data is displayed on the display unit 6 (at a step S16).

This application claims priority from Japanese Patent Application No. 2004-38973 filed Feb. 16, 2004, and Japanese Patent Application No. 2005-020042 filed Jan. 27, 2005, which are hereby incorporated by reference herein.

What is claimed is:

1. A signal processing method to be performed by a signal processing circuit for convening an input signal, which is an image signal for displaying an image on a display unit, into a converted value within a predetermined variable range according to a predetermined conversion characteristic, the method comprising:
    a dividing step of dividing the variable range of the input signal into a plurality of ranges;
    a first specifying step of specifying the conversion characteristic corresponding to input signals within a range of value p to value m, where the value m is a maximum value of values of input signals which are subject to the signal processing circuit and the value p is a value smaller than the value m and not a minimum value of the input signal;
    a second specifying step of specifying the conversion characteristic corresponding to input signals within a range of a minimum value of values of input signals which are subject to the signal processing circuit to value r, where the value r is a value smaller than the value p and not the minimum value of the input signal;
    an intermediate-range step of specifying the conversion characteristic corresponding to input signals having the values r to p;
    a converting step of convening the input signals by using the specified conversion characteristics; and
    an applying step of applying the convened signals to display;
    wherein the first specifying step comprises:
        a first step of calculating a value obtained by multiplying the variable range of the convened value by a ratio of the number of times of inputting the input signal having any one of values from p to m within a predetermined period, to the number of times of inputting the input signal within the predetermined period;
        a second step of subtracting the value calculated at the first step from a maximum value within the variable range of the converted value or a value near the maximum value, and
        a third step of specifying the conversion characteristic corresponding to input signals having the values p to m by an interpolated value obtained by performing an interpolation, by using an interpolation circuit, using at least the value obtained in the second step and the maximum value within the variable range of the convened value or the value near the maximum value as interpolation source data, and
    wherein the second specifying step comprises:
        a fourth step of calculating a value obtained by multiplying the variable range of the convened value by a ratio of the number of times of inputting the input signal having any one of values from the minimum value of values of input signals which are subject to the signal processing circuit to r within the predetermined period, to the number of times of inputting the input signal within the predetermined period; and
        a fifth step of specifying the conversion characteristic corresponding to input signals having the minimum value of values of input signals which are subject to the signal processing circuit to the value r by an interpolated value obtained by performing an interpolation, by using an interpolation circuit, using at least the value obtained at the fourth step and a minimum value within the variable range of the converted value or a value near the minimum value as the interpolation source data.

2. A signal processing method according to claim 1, wherein the intermediate-range step includes a third specifying step of specifying the conversion characteristic corresponding to input signals within a range of value q to value p, where the value q is a value smaller than the value p and is larger than the value of r, wherein the third specifying step comprises:

a sixth step of calculating a value obtained by multiplying the variable range of the converted value by a ratio of the number of times of inputting the input signal having any one of values q to p within the predetermined period, to the number of times of inputting the input signal within the predetermined period;

a seventh step of subtracting the value calculated at the sixth step from the value calculated at the second step; and an eighth step of specifying the conversion characteristic corresponding to the input signals having the values q to p by an interpolated value obtained by performing an interpolation, by using an interpolation circuit, using at least the value obtained at the seventh step and the value obtained at the second step as the interpolation source data.

3. A signal processing method according to claim 1, wherein the intermediate-range step includes a fourth specifying step of specifying the conversion characteristic corresponding to input signals within a range of value r to value s, where the value s is a value smaller than the value p and is a value larger than the value r, wherein the fourth specifying step comprises:

a ninth step of calculating a value obtained by multiplying the variable range of the converted value by a ratio of the number of times of inputting the input signal having any one of values from the value r to the value s within the predetermined period, to the number of times of inputting the input signals within the predetermined period;

a tenth step of calculating a value obtained by adding up the value calculated at the fourth step and the value calculated at the ninth step, and an eleventh step of specifying the conversion characteristic corresponding to the input signals having the values r to s by an interpolated value obtained by performing an interpolation, by using an interpolation circuit, using at least the value obtained at the fourth step and the value obtained at the tenth step as the interpolation source data.

4. A signal processing method according to claim 1, wherein the ratio of the number of times of inputting the input signal having any one of the values from the value p to the value m during the predetermined period to the number of times of inputting the input signal during the predetermined period is obtained by an approximation calculation.

5. A signal processing circuit for converting an input signal which is an image signal for displaying an image on a display unit into a converted value within a predetermined variable range according to a predetermined conversion characteristic, the signal processing circuit comprising:

a dividing unit that divides the variable range of the input signal into a plurality of ranges;

a first specifying unit that specifies the conversion characteristic corresponding to input signals within a range of value p to value m, where the value m is a maximum value of values of input signals that are subject to the signal processing circuit and the value p is a value smaller than the value m and not a minimum value of the input signal;

a second specifying unit that specifies the conversion characteristic corresponding to input signals within a range of p, minimum value of values of input signals that are subject to the signal processing circuit to value r, where the value r is a value smaller than the value p and not the minimum value of the input signal;

an intermediate-range unit of specifying the conversion characteristic corresponding to input signals having the values r to p;

a convening unit that converts the input signals by using the specified conversion characteristics;

an applying unit that applies the converted signals to display;

an interpolation unit;

wherein the first specifying unit comprises:

a first counter unit that calculates a first value obtained by multiplying the variable range of the convened value by a ratio of the number of times of inputting the input signal having any one of values from p to m within a predetermined period, to the number of times of inputting the input signal within the predetermined period; and an operation unit that calculates a second value obtained by subtracting the first value from a maximum value within the variable range of the converted value or a value near the maximum value;

wherein the interpolation unit specifies the conversion characteristic corresponding to input signals having the values p to m by an interpolated value obtained by performing an interpolation using at least the second value and the maximum value within the variable range of the convened value or the value near the maximum value as interpolation source data, and wherein the second specifying unit comprises:

a second counter unit that calculates a third value obtained by multiplying the variable range of the converted value by a ratio of the number of times of inputting the input signal having any one of values from the minimum value of values of input signals that are subject to the signal processing circuit to r within the predetermined period, to the number of times of inputting the input signal within the predetermined period;

wherein the interpolation unit specifies the conversion characteristic corresponding to input signals having the minimum value of values of input signals that are subject to the signal processing circuit to the value r by an interpolated value obtained by performing an interpolation using at least the third value and a minimum value within the variable range of the convened value or a value near the minimum value as the interpolation source data.

* * * * *